United States Patent [19]
Hönig et al.

[11] Patent Number: 5,264,497
[45] Date of Patent: Nov. 23, 1993

[54] CROSSLINKING COMPONENTS FOR CATHODICALLY DEPOSITABLE PAINT BINDERS

[75] Inventors: Helmut Hönig; Herbert Matzer; Georg Pampouchidis; Willibald Paar, all of Graz, Austria

[73] Assignee: Vianova Kunstharz, A.G., Werndorf, Austria

[21] Appl. No.: 787,313

[22] Filed: Sep. 17, 1991

[30] Foreign Application Priority Data

Sep. 17, 1990 [AT] Austria ............................ 1875/90

[51] Int. Cl.$^5$ ................ C08F 283/01; C08F 283/02; C08F 283/04
[52] U.S. Cl. ...................................... 525/453; 528/45
[58] Field of Search ........................... 525/453; 528/45

[56] References Cited

U.S. PATENT DOCUMENTS 4,897,435 1/1990 Jacobs, III et al. ................. 525/504
5,057,559 10/1991 Paar et al. ........................... 525/504

Primary Examiner—Melvyn I. Marquis
Assistant Examiner—D. Aylward
Attorney, Agent, or Firm—Breiner & Breiner

[57] ABSTRACT

Crosslinking components for cationic paint binders which are reaction products of hydroxyl-functional carbamate compounds with half-blocked diisocyanates are described. The carbamate compounds are reaction products of cyclic organic carbonates with aliphatic monoamines and/or diamines and/or triamines and/or tetraamines and/or alkanolamines, all such amines having primary and/or secondary amino groups. The crosslinking components produced according to the invention, in combination with resin components carrying hydroxyl groups and/or primary or secondary amino groups, preferably with those based on epoxide/amine adducts or containing similar molecular units, give binders which can be baked at temperatures of 140° C. and higher.

12 Claims, No Drawings

CROSSLINKING COMPONENTS FOR CATHODICALLY DEPOSITABLE PAINT BINDERS

FIELD OF INVENTION

This invention relates to crosslinking components for cationic paint binders. More particularly, it relates to crosslinking components for cationic paint binders which are reaction products of hydroxyl-functional carbamate compounds with half-blocked diisocyanates.

BACKGROUND OF INVENTION

Variously based cationic paint binders are used in their protonized, water-dilutable form especially in the electrodip painting process (CED process) for corrosion-resistant primers or decorative one-layer coatings. However, the crosslinking by amino resins or phenolic resins usual for other paint systems is not advantageous for cationic binders because of the basic character of the applied film.

In U.S. Pat. No. 2,995,531, a process is proposed for utilizing blocked polyisocyanates, which unblock at the baking or curing temperature for the crosslinking of cationic binders. According to German Patent No. 2,057,799, this method is also employed for the paint films applied by the CED process. In a large number of publications, such crosslinking components for CED binders are modified in diverse ways.

EP-A2-149,156 describes crosslinking components which are based on carbamates obtained from polyprimary amines and organic carbonates which permit urethane linkages without the use of isocyanate compounds.

With all of the known crosslinking components, however, a lowering of the baking or curing temperature is possible only if relatively large quantities of heavy metal catalysts, such as salts of tin or lead, are used. It has now been found that low baking or curing temperatures are possible if reaction products of hydroxyl-functional carbamate compounds with half-blocked diisocyanates are used as the crosslinking component.

SUMMARY OF INVENTION

Accordingly, the present invention relates to a process for the production of crosslinking components for cationic paint binders having hydroxyl groups and/or primary or secondary amino groups, which is characterized in that at least 50%, preferably 60 to 100%, of the isocyanate-reactive groups of hydroxyl-functional carbamate compounds are reacted with diisocyanates which are half-blocked by monohydroxy compounds and have an unblocking temperature below 180° C. The carbamate compounds are those obtained by reaction of cyclic organic carbonates, preferably ethylene carbonate and/or propylene carbonate, with aliphatic monoamines and/or diamines and/or triamines and/or tetraamines and/or alkanolamines, all these amines having primary and/or secondary and, if appropriate, tertiary reaction-inert amino groups.

The invention also relates to the crosslinking components produced according to the invention and to the use of the crosslinking components produced according to this invention in combination with cationic base resins, which contain hydroxyl groups and/or primary or secondary amino groups and are water-dilutable after protonation, as binders for water-dilutable paints, especially for cathodically depositable electrodip coatings.

In combination with cationic resin components carrying hydroxyl groups and/or primary or secondary amino groups, preferably products containing epoxide/amine adducts or similar molecular units, are used with the crosslinking components produced according to the invention to give binders which can be baked or cured at temperatures as low as 140° C and higher. The films thus obtained show excellent corrosion resistance on non-pretreated or pretreated substrates.

The hydroxyl-functional carbamate compounds used according to the invention are obtained by reaction of cyclic organic carbonates, especially alkylene carbonates such as ethylene carbonate or propylene carbonate, with aliphatic monoamines and/or diamines and/or triamines and/or tetraamines and/or alkanolamines, all these amines having primary and/or secondary and, if appropriate, tertiary reaction-inert amino groups. For use in the process according to the present invention, hydroxyl-functional carbamate compounds can also be used which, as the starting product, contain secondary amino compounds which have been obtained by reaction of 1 mol of aliphatic diamines having primary amino groups with 2 mols of monoepoxide compounds or of 2 mols of aliphatic monoamines having a primary amino group and/or of aliphatic diamines having a primary and a tertiary reaction-inert amino group with 1 mol of diepoxide compounds. Mixtures of different amines can also be used.

The synthesis of the carbamate compounds is carried out in the known manner at 60° to 120° C. to obtain an amine number of less than 10 mg KOH/g. The production of the crosslinking components according to the invention takes place by reaction of the isocyanate-reactive hydroxyl groups and of the secondary amino groups, if present, of the carbamate compounds with half-blocked diisocyanate compounds at 60° to 120° C., if necessary in the presence of catalysts such as triethylamine or dibutyltin dilaurate. At least 50%, preferably 60 to 100%, of the isocyanate-reactive groups present are reacted with the half-blocked diisocyanates. The half-blocked diisocyanates are obtained in known manner by reaction of equimolar quantities of a diisocyanate with a monohydroxy compound.

Aliphatic, cycloaliphatic and aromatic diisocyanates can be used according to the invention. Hexamethylene diisocyanate, isophorone diisocyanate, toluylene diisocyanate or xylylene diisocyanate are representatives of such compounds. Preferably, diisocyanates are used whose isocyanate groups show different reactivity, such as toluylene diisocyanate or isophorone diisocyanate. The diisocyanates half-blocked by monohydroxy compounds should have an unblocking temperature of less than about 180° C. Suitable monohydroxy-functional compounds for the blocking of the isocyanate group are aliphatic alcohols or glycol ethers, such as 2-ethylhexanol or ethylene glycol monoethyl ether, or unsaturated alcohols such as hydroxyethyl acrylate. Substituted phenols, such as methylphenol and homologous compounds, or combinations of different blocking agents can also be used. Ketoximes are used as particularly preferred monohydroxy compounds, whereby the baking temperature can be lowered down to 140° C. even in the case of uncatalyzed binder systems.

The production of the paints, using the crosslinking component produced according to the present invention, is carried out in the known manner by mixing with the base resin component at a moderately elevated temperature. The crosslinking components produced according to the invention are employed in a quantity of from about 10 to 40% by weight, preferably 15 to 30% by weight, relative to the total binder. The formulation of the paints, their pigmentation, production and processing, particularly by the cathodic electrodip-coating process, are known to those skilled in the art.

The examples which follow illustrate the invention, without restricting its scope. All data in parts or percentages relate to weight units unless otherwise started.

In the examples, the following abbreviations are used for the raw materials employed:

(a) Amino Compounds

| | |
|---|---|
| PA | n-Pentylamine |
| DOLA | Diethanolamine |
| AEPD | 2-Aminoethylpropane-1,3-diol |
| AEEA | Aminoethylethanolamine |
| HMDA | 1,6-Hexamethylenediamine |
| DETA | Diethylenetriamine |
| DA I | Reaction product of 1 mol of polyoxyalkylenediamine (molecular weight about 400) with 2 mols of 2-ethylhexyl glycidyl ether |
| DA II | Reaction product of 1 mol of a diepoxide resin based on polypropylene glycol (molecular weight about 640) with 2 mols of 3-diethylamino-1-propylamine |

(b) Cyclic Carbonates

| | |
|---|---|
| EC | Ethylene carbonate |
| PC | Propylene carbonate |

(c) Diisocyanate Compounds

| | |
|---|---|
| IC 1 | Hexamethylene diisocyanate |
| IC 2 | Toluylene 2,4-diisocyanate |
| IC 3 | Isophorone diisocyanate |
| IC 4 | Xylylene diisocyanate |

(d) Hydroxyl-Functional Blocking Agents

| | |
|---|---|
| HV 1 | Ethylene glycol monobutyl ether |
| HV 2 | 2-Ethylhexanol |
| HV 3 | Methyl ethyl ketoxime |
| HV 4 | 2-Hydroxypropyl acrylate |

(e) Organic Solvents

| | |
|---|---|
| DGDME | Diethyl glycol dimethyl ether |
| MIBK | Methyl isobutyl ketone |
| X | Xylene |

(f) Catalysts

| | |
|---|---|
| TEA | Triethylamine |
| DBTL | Dibutyltin dilaurate |
| DMBA | Dimethylbenzylamine |

The quantity and nature of the starting materials for the production of the crosslinking components, and the reaction conditions, can be taken from the following Tables 1 to 3.

TABLE 1

Hydroxy-Functional Carbamate Compounds (HC)

| HC | Parts of Amine | | (mol) | Parts of Carbonate | | (mol) | Functionality Mol OH | Mol NH | Reaction Temperature | MW °C. |
|---|---|---|---|---|---|---|---|---|---|---|
| 1 | 87 | PA | (1.0) | 88 | EC | (1.0) | 1 | 1 | 70 | 175 |
| 2 | 105 | DOLA | (1.0) | 102 | PC | (1.0) | 3 | 0 | 110 | 207 |
| 3 | 119 | AEPD | (1.0) | 102 | PC | (1.0) | 3 | 1 | 80 | 221 |
| 4 | 103 | DETA | (1.0) | 264 | EC | (3.0) | 3 | 2 | 60 | 367 |
| 5 | 772 | DA I | (1.0) | 204 | PC | (2.0) | 4 | 0 | 120 | 976 |
| 6 | 900 | DA II | (1.0) | 204 | PC | (2.0) | 4 | 0 | 120 | 1104 |
| 7 | 116 | HMDA | (1.0) | 204 | PC | (2.0) | 2 | 2 | 110 | 320 |
| 8 | 104 | AEEA | (1.0) | 204 | PC | (2.0) | 3 | 1 | 110 | 308 |

TABLE 2

Half-Blocked Diisocyanates (HDI)

| HDI | Parts of Diisocyanate | | (mol) | Parts of Blocking Agent | | (mol) | MW |
|---|---|---|---|---|---|---|---|
| 1 | 168 | IC 1 | (1.0) | 87 | HV 3 | (1.0) | 255 |
| 2 | 174 | IC 2 | (1.0) | 118 | HV 1 | (1.0) | 292 |
| 3 | 174 | IC 2 | (1.0) | 130 | HV 4 | (1.0) | 304 |
| 4 | 222 | IC 3 | (1.0) | 130 | HV 2 | (1.0) | 352 |
| 5 | 188 | IC 4 | (1.0) | 96 | HV 3 | (1.0) | 284 |

TABLE 3

Example 1-10
Preparation of the Crosslinking Components According to the Invention (HK)

| Example HK | Parts | HC | Parts | HDI (mol) | Temperature | Solution[1] | Catalysis[2] |
|---|---|---|---|---|---|---|---|
| 1 | 175 | HC 1 | 584 | HDI 2 (2.0) | 70° C. | 80 X | 1.0 TEA |
| 2 | 207 | HC 2 | 912 | HDI 3 (3.0) | 75° C. | 70 DGDME | — |
| 3 | 976 | HC 5 | 1020 | HDI 1 (4.0) | 70° C. | 80 DGDME | 1.0 DBTL |
| 4 | 367 | HC 4 | 1136 | HDI 5 (4.0) | 80° C. | 70 MIBK | 0.5 DMBA |
| 5 | 1104 | HC 6 | 1110 | HDI 2 (3.8) | 65° C. | 65 DGDME | — |
| 6 | 221 | HC 3 | 1020 | HDI 1 (4.0) | 90° C. | 90 X | 0.5 DBTL |
| 7 | 207 | HC 2 | 1232 | HDI 4 (3.5) | 80° C. | 90 MIBK | 1.0 TEA |
| 8 | 221 | HC 3 | 1232 | HDI 4 (3.5) | 90° C. | 90 MIBK | 1.0 DMBA |
| 9 | 320 | HC 7 | 584 | HDI 2 (2.0) | 75° C. | 80 X | 0.5 TEA |
| 10 | 308 | HC 8 | 912 | HDI 3 (3.0) | 80° C. | 80 MIBK | 0.5 DMBA |

[1]% by weight of solid resin in solvent
[2]% by weight/solid resin

For testing the crosslinking components according to Examples 1-8 in cathodically depositable electrodip coatings, the following base resins were prepared:

(BH 1): 1000 g of an epoxide resin (based on bisphenol A and epichlorohydrin; epoxide equivalent weight about 500) are dissolved in 512 g of ethylene glycol monoethyl ether at 60° to 70° C. in a reaction vessel fitted with a stirrer, thermometer and reflux condenser. 37 g of diethylamine and 158 g of diethanolamine are then added and the batch is reacted for 3 hours at 100° C. (hydroxyl number = 375 mg KOH/g). The resulting solids content is 70%.

(BH 2): 168 g of isononanoic acid, 53 g of diethanolamine and 33 g of diethylaminopropylamine are added to a solution of 1000 g of an epoxide resin (based on bisphenol A and epichlorohydrin; epoxide equivalent weight about 500) in 551 g of methoxypropanol at 70° C. and the reaction mixture is held at 95° to 100° C. until an acid number of less than 3 mg KOH/g has been reached (hydroxyl number =270 mg KOH/g). The resulting solids content is 69.5%.

(BH 3): 500 parts of an epoxide resin (based on bisphenol A and epichlorohydrin; epoxide equivalent weight about 500) are dissolved in 214 parts of propylene glycol monomethyl ether and reacted at 110° C. with 83 parts of a half-ester of phthalic anhydride and 2-ethylhexanol in the presence of 0.5 g of triethylamine as catalyst down to an acid number of less than 3 mg KOH/g. 120 parts of an NH-functional oxazolidine obtained from aminoethylethanolamine, 2-ethylhexyl acrylate and formaldehyde and also 26 parts of diethylaminopropylamine are then added and the batch is reacted at 80° C. until an epoxide value of virtually 0 is reached. The batch is diluted with 200 parts of propylene glycol monomethyl ether and partially neutralized with 97 parts of 3 N formic acid. The resulting solids content is 58.8%.

From the binder mixtures indicated in Table 4, paints corresponding to the data given in this table were produced and, after neutralization with formic acid and dilution with deionized water to a solids content of 18%, were electrically deposited on zinc-phosphated steel sheet in the known manner. At the baking temperature stated, coated sheets show, at a film thickness of 23±2μm, a salt spray resistance according to ASTM-B 117-85 of more than 1000 hours (less than 2 mm infiltration at the crosscut).

The pigment paste used is composed of 100 parts of grinding resin (solid), 1 part of carbon black pigment, 12 parts of basic lead silicate and 147 parts of titanium dioxide. (BH 3) is used as the grinding resin.

As a comparison example (V), a urethane crosslinking agent was synthesized as indicated below:

134 parts of trimethylolpropane are reacted in 239 parts of diethylene glycol dimethyl ether at 80° C. with 821 parts of a toluylene diisocyanate half-blocked with 2-ethylhexanol up to complete consumption of all the isocyanate groups.

Table 4 is as follows:

TABLE 4

Composition of the Binder Combinations for the Test Paints, Composition of the Test Paints, and Baking Conditions.

| Binder Mixture | | | Paint Composition | | | | |
|---|---|---|---|---|---|---|---|
| Base Resin Parts (Solid Resin) | Curing Component HK (Solid Resin) | Binder Mixture[1] | Pigment Paste Corresponding to 25 Parts of Solid Resin + 40 Parts of Pigment | Neutralizing Agent[2] Total | Catalyst | | Baking Conditions 20 Minutes °C. |
| 70 BH 1 | 30 HK 1 | 103 | 83 | 50 | 0.5 | Sn | 150 |
| 75 BH 2 | 25 HK 2 | 107 | 83 | 40 | — | | 160 |
| 70 BH 3 | 30 HK 3 | 117 | 83 | 35 | — | | 140 |
| 80 BH 3 | 20 HK 4 | 123 | 83 | 35 | — | | 150 |
| 60 BH 2 | 40 HK 5 | 110 | 83 | 30 | 0.5 | Pb | 150 |
| 80 BH 3 | 20 HK 6 | 118 | 83 | 35 | — | | 150 |
| 75 BH 1 | 25 HK 7 | 101 | 83 | 55 | — | | 160 |
| 70 BH 3 | 30 HK 8 | 114 | 83 | 40 | 0.4 | Sn | 140 |
| 70 BH 3 | 30 HK 9 | 117 | 83 | 40 | 0.5 | Sn | 150 |
| 75 BH 2 | 25 HK 10 | 104 | 83 | 35 | 0.5 | Pb | 150 |
| 70 BH 2 | 30/V | 103 | 83 | 60 | 1.0 | Sn | 190[4] |

[1]Corresponding to 75 parts of solid resin
[2]Millimol of formic acid/100 g of solid resin
[3]% of metal/solid resin
Pb = lead in the form of lead octoate;
Sn = tin in the form of dibutyltin dilaurate
[4]No satisfactory film formation at baking temperatures below 170° C.

As will be apparent to one skilled in the art, various modifications can be made within the scope of the aforesaid description. Such modifications being within the ability of one skilled in the art form a part of the present invention and are embraced by the appended claims.

What is claimed is:

1. Process for the production of crosslinking components for cationic paint binders having hydroxyl groups and/or primary or secondary amino groups, comprising reacting at least 50% of the isocyanate-reactive groups of hydroxyl-functional carbamate compounds with diisocyanates which are half-blocked with monohydroxy compounds and have an unblocking temperature below about 180° C.

2. The process of claim 1 wherein the carbamate compounds are obtained by reaction of cyclic organic carbonates with aliphatic monoamines, diamines, triamines, tetraamines or alkanolamines, said amines having at least primary or secondary amino groups.

3. The process of claim 2 wherein said amines also have tertiary reaction-inert amino groups.

4. The process of claim 2 wherein from about 60 to 100% of the isocyanate-reactive groups of said carbamate compounds are reacted.

5. The process of claim 2 wherein the cyclic organic carbonates are ethylene carbonate or propylene carbonate.

6. Process according to claim 1 wherein the carbamate compound is the reaction product of alkylene carbonates with secondary amino compounds obtained by reaction of 1 mol of an aliphatic diamine having primary amino groups with 2 mols of a monoepoxide compound or of 2 mols of aliphatic monoamines having a primary amino group or aliphatic diamines having a primary and a tertiary reaction-inert amino group with 1 mol of diepoxide compounds.

7. Crosslinking components for cationic paint binders having hydroxyl groups and/or primary or secondary amino groups, comprising the reaction product of hydroxyl-functional carbamate compounds with diisocyanates which are half-blocked with monohydroxy compounds and have an unblocking temperature below about 180° C., whereby at least 50% of the isocyanate reactive groups of said carbamate are reactive with said half-blocked diisocyanates.

8. The crosslinking component of claim 7 wherein the carbamate compounds are reaction products of cyclic organic carbonates with aliphatic monoamines, diamines, triamines, tetraamines or alkanolamines, said amines having at least primary or secondary amino groups.

9. The crosslinking component of claim 8 wherein said amines also have tertiary reaction-inert amino groups.

10. The crosslinking component of claim 7 wherein from about 60 to 100% of the isocyanate-reactive groups of said carbamate compounds have been reacted.

11. The crosslinking component of claim 8 wherein the cyclic organic carbonates are ethylene carbonate or propylene carbonate.

12. The crosslinking component of claim 7 wherein the carbamate compound is the reaction product of alkylene carbonates with secondary amino compounds obtained by reaction of 1 mol of an aliphatic diamine having primary amino groups with 2 mole of a monoepoxide compound or of 2 mols of aliphatic monoamines having a primary amino group or aliphatic diamines having a primary and a tertiary reaction-inert amino group with 1 mol of diepoxide compounds.

* * * * *